US007302080B2

(12) United States Patent
Esping et al.

(10) Patent No.: US 7,302,080 B2

(45) Date of Patent: Nov. 27, 2007

(54) SYSTEM FOR INSTALLATION

(75) Inventors: Stefan Esping, Löddeköpinge (SE); Peter Gustafsson, Lund (SE); Dan Hovang, Lund (SE); Mats Elfving, Lund (SE); Noroz Akhlagi, Dalby (SE)

(73) Assignee: Secumanagement B.V., Ad Leidschendam (NL)

( * ) Notice: Subject to any disclaimer, the term of this patent is extended or adjusted under 35 U.S.C. 154(b) by 868 days.

(21) Appl. No.: 10/260,764

(22) Filed: Sep. 27, 2002

(65) Prior Publication Data

US 2003/0071199 A1 Apr. 17, 2003

Related U.S. Application Data

(60) Provisional application No. 60/328,644, filed on Oct. 10, 2001.

(30) Foreign Application Priority Data

Sep. 28, 2001 (SE) .................................... 0103225

(51) Int. Cl.
*G06K 9/00* (2006.01)

(52) U.S. Cl. ....................... 382/103; 382/274; 348/143

(58) Field of Classification Search ................ 382/103, 382/107, 106, 108, 140, 155, 168, 171, 177, 382/181, 194, 201, 203, 255, 260, 274, 282–295, 382/305, 321; 348/143, 150; 340/436, 539.11; 235/462.01

See application file for complete search history.

(56) References Cited

U.S. PATENT DOCUMENTS

| | | | | |
|---|---|---|---|---|
| 5,097,328 | A * | 3/1992 | Boyette | 348/150 |
| 6,633,231 | B1 * | 10/2003 | Okamoto et al. | 340/539.11 |
| 6,697,103 | B1 * | 2/2004 | Fernandez et al. | 348/143 |
| 6,753,766 | B2 * | 6/2004 | Patchell | 340/436 |
| 6,948,659 | B2 * | 9/2005 | Tsikos et al. | 235/462.01 |

FOREIGN PATENT DOCUMENTS

| | | | |
|---|---|---|---|
| EP | 0126955 | | 12/1984 |
| EP | 0736837 | | 10/1996 |
| WO | WO 9965005 | | 12/1999 |
| WO | WO 0142606 | | 6/2001 |
| WO | WO 0171688 | * | 9/2001 |

* cited by examiner

*Primary Examiner*—Seyed Azarian
(74) *Attorney, Agent, or Firm*—Birch, Stewart, Kolasch & Birch, LLP

(57) ABSTRACT

A method and system for installation of a monitoring unit. The monitoring unit comprises a photosensitive sensor for recording images of a monitored location. The system further comprises a light emitting element. The monitoring unit is arranged to detect the position of the light emitting element in a recorded image and by means of said position specify a sub-location within the monitored location.

12 Claims, 4 Drawing Sheets

SYSTEM FOR INSTALLATION

CROSS-REFERENCE TO RELATED APPLICATION

This application is related to, and claims the benefit of, a previously filed U.S. provisional patent application, titled "System for Installation," application No. 60/328,644, filed Oct. 10, 2001.

FIELD OF THE INVENTION

This invention relates to a method and a system for installation of a monitoring unit incorporated in the system. The monitoring unit comprises a photosensitive sensor for recording images of a monitored location. The invention also relates to an device for installation, a monitoring unit and a computer program product.

PRIOR ART

Different types of monitoring system with photosensitive sensors (digital cameras) are used today in different applications such as burglary surveillance. The sensor records images of a location that is to be monitored.

The monitored location may be divided into different sub-locations within which different functions and criteria apply. These sub-locations can be defined by one or more coordinates in the image. The appearance and function of the sub-locations is different from place to place and from application to application. These sub-locations can, for example, in monitoring be used to mark doors through which persons are expected to enter.

Today there are different methods to set the coordinates for different sub-locations. For example, preselected values can be used, but a problem is that the parameters cannot be changed to adapt the image processing algorithms to the current installation/placement of the sensor. This implies that the monitoring system must be located in a predetermined way. If this is not accomplished, the performance of the system is reduced.

Another way is to supply the monitoring system with a switch or a keyboard, which can be set in a number of positions which define different predetermined sub-locations. A disadvantage of this technique is that the switch can only be set in a limited number of positions. Additionally it is necessary to measure, for example, a distance to set the system. This can be complicated and time-consuming and less accurate.

Another way is to connect the monitoring system to a computer which is in direct communication with a calculating unit that processes the images recorded by the sensor. This computer can comprise a display on which an image recorded by the sensor is shown. Furthermore, the computer can be provided with special computer software which enables the person carrying out the installation to draw different sub-locations in the recorded image shown on the display. A disadvantage of this solution is that it requires special and advanced computer equipment and knowledge of the functions of the equipment in order to enable the person carrying out the installation to install a monitoring system. It also requires special communication interfaces and contacts to connect the computer to the system, which causes extra installation work and increased costs. Further it can be difficult in practice to exactly mark intended positions on the display, for example with a mouse, for instance due to insufficient contrast or inexact rendition on the display.

Published European Patent Application No. EP 0736837A2 discloses a infrared transmitter and receiver, making possible to control a cursor at a monitor. The transmitter has two IR senders and the receiver has two IR receivers arranged ortogonally in relation to the senders. By tilting the IR senders, the two receivers obtain different signal strength, and the direction of the sender can be calculated to move the cursor to the calculated position on the monitor.

European Patent No. EP 0126955B1 discloses a video surveillance system in which the surveillance area is divided in sections by distinct markings arranged at the ground. The markings have different degrees of gray to be able to be distinguished from gray objects passing the markings. One marking has vertical surfaces in order not to be covered by snow or similar.

SUMMARY OF THE INVENTION

An object of the invention is therefore to solve the problems described above and thus provide a system for installation of a monitoring unit, a method for installation of a monitoring unit, a monitoring unit and a device, which in a simple way can perform a correct and optimal installation of a monitoring unit comprising a photosensitive sensor.

The invention concerns, according to a first aspect, a system for installation of a monitoring unit, comprising a photosensitive sensor for recording images of a monitored location. The system comprises a light emitting element. The monitoring unit is arranged to detect, during installation, the position of the light emitting element in a recorded image and by means of said position define a sub-location within the monitored area.

The detected position can represent a point or a pixel in the recorded image. The coordinates of the point in the recorded image can be determined to define the position. The position can constitute a point in a larger pattern. The position can wholly or partly define a sub-location within the monitored area or location. The sub-location can also be a line separating, for instance, one part of the monitored location from another. The sub-locations can also be a single position or a point that is to be monitored. This is suitable, for example, if it is desired to monitor a button or a mark.

A sub-location can essentially have any desired shape to divide the monitored location. For example, the sub-location can be circular, and a detected position can indicate the center of the circular location. The extension of the circular location can be predetermined but can also be defined by detecting an additional position, which indicates the radius of the circular location. The sub-location can also be rectangular and be defined by four positions in the respective corners of the rectangle. Alternatively the rectangular location can be defined by two positions located in two corners diagonally to each other in the rectangle.

A sub-location can thus be defined by one or more positions. In principle, any number of positions can be detected. A person carrying out the installation can, with the light emitting element, draw a line or the limitation of a sub-location in physical reality, which then is detected by the monitoring unit.

With an increased number of positions a specific and unique configuration of a desired sub-location may be defined. In some cases, only a simple division of the monitored location is needed and consequently the installation can be performed quickly.

The different sub-locations can be associated with different functions. For example, in one sub-location a moving object can be allowed and movement detection is allowed in this location but in another sub-location no such object is allowed and movement detection in this location will cause an alarm.

The light emitting element can be an ordinary lamp, for example a flashlight. An advantage of the very simple light emitting element is that the system will be easy to implement and thus cost-effective. The system is also easy for a user to utilize.

Another advantage of the system is that it can be used in different applications. The setting of sub-locations can be desirable in many situations, for example, in automatic door openers and in burglary surveillance. It is possible to use the same equipment for all these types of installations.

One thing that separates the different applications is the function in the different sub-locations when the monitoring unit is operating. An advantage of the invention is that a person carrying out the installation does not need to have special knowledge to install the monitoring unit for different applications. This enables quicker and easier assembly and installation and, as a result, the costs for installation are reduced.

Another advantage of the system is that the definition of the sub-location will be more exact since the definition of the desired sub-location in the monitored location can be made in physical reality and transferred to the "the image world" of the monitoring unit. The word "image world" means how the monitoring unit perceives the physical reality. This causes the monitoring unit in operation to carry out a more thorough analysis of a recorded image, which in turn causes the monitoring result to be more secure and more reliable.

In one embodiment of the system, the monitoring unit further comprises means for receiving a signal containing information which identifies or qualifies said position.

The signal can contain information about what type of pattern the position defines. The pattern reflects the shape of a sub-location. If a pattern is defined by several points, the signal can contain information about to what point in the pattern the current position relates.

The monitoring unit can initially possess information about what pattern is to be created, and the information received by the signal can contain information about to what point in this pattern a detected position corresponds.

An advantage of the receiving the signal containing this information is that the monitoring unit quickly and unambiguously receives information about how the detected position is to be interpreted. The monitoring unit does not need to guess or calculate what pattern the position represents, thus saving processor power.

In one embodiment said means for receiving and the photosensitive sensor consist of one and the same component.

The light emitting element can, in addition to marking a position in the image, also have the function of transferring information about the meaning of the detected position. This information can, for example, be transferred by flashing the light emitting element at a certain frequency or a determined number of times, which is recorded by the photosensitive sensor.

In one embodiment the system comprises a remote device comprising a means for sending, which is arranged to emit said signal to the monitoring unit, which signal comprises information identifying said position.

The remote device can be arranged as a conventional remote control, for example, to control a television receiver. This allows a simple and conventional construction. The same remote device can be used for different applications, which results in lower manufacturing cost. This makes it easy for the person carrying out the installation, who can easily install monitoring units for different applications without having to learn application specific characteristics. The remote device can also be used to control the normal function of the monitoring unit.

In one embodiment, the remote device comprises a key set, each key in the key set being associated with a determined position.

Different keys in the key set can identify different positions. An advantage of the key set is that it will be easy for the person carrying out the installation to specify what position is to be detected by the monitoring unit by pushing one single key. The remote device is also simple to use.

In another embodiment, the key set is formed according to a specified pattern representing a sub-location of the monitored location, a key in the key set corresponding to a specified position with which the sub-location can be defined.

By forming the key set in this way, a person carrying out the installation can receive visual assistance to find out what positions are to be detected to set up a specific sub-location. The person carrying out the installation receives in this way information about which and how many positions need be detected for a specific sub-location. This makes the installation easier and quicker.

The light emitting element can be arranged on the remote device. An advantage of this is that there is no need for an extra, separate unit for the light emitting element. This simplifies the construction. The use of the system also becomes simpler. Additionally the cost for the system becomes lower by integrating two separate units.

In another embodiment of the system, the light emitting element and the means for sending constitute one and the same component.

An integration of the light emitting element and the means for sending results in simpler and more flexible construction, since there is no need for any extra equipment for the light emitting element. By also using the means for sending as the light emitting element, a double function is achieved. This decreases the cost of the system.

In one embodiment of the system, said component is a light emitting diode, for example of IR type.

The photosensitive sensor can record IR light and is thus able to detect the position in the recorded image. The means for receiving a signal can be an IR receiver receiving the signal with information. Alternatively the means for receiving the signal can be the photosensitive sensor itself.

In one embodiment, the monitoring unit is further provided with a memory arranged to store said detected position for later use in a control program.

The position is stored in a RAM memory to be used directly to specify a sub-location. The position is advantageously also stored in a non-volatile memory to be able to reuse the position even if the monitoring unit for example is turned off.

According to a second aspect, the invention relates to an device for installation of a monitoring unit comprising a photosensitive sensor for recording images of a monitored location. The device comprising a means for sending, which is arranged to emit a signal containing information identifying a position in a recorded image, which position specifies a sub-location within the monitored location.

Advantages of the arrangement have essentially been indicated above in the description of the system.

According to a third aspect, the invention relates to a monitoring unit comprising a photosensitive sensor arranged to record images of a monitored location. The monitoring unit comprises a processing unit arranged to detect the position of a light emitting element in a recorded image and by means of this position specify a sub-location of the monitored location.

Advantages of the monitoring unit have essentially been indicated above in the description of the system.

According to a fourth aspect, the invention relates to a method for installation of a monitoring unit comprising a photosensitive sensor for recording images of a monitored location. The method comprises the steps of recording at least one image of the monitored location and in the recorded image detecting the position of a light emitting element and by means of this position specifying a sub-location of the monitored location.

The method has essentially the same advantages as the above described system.

In one embodiment of the method, the light emitting element is placed in turns at a number of different places. The positions of the light emitting element which are detected in each recorded image are used together to determine said sub-location.

According to a fifth aspect, the invention relates to a computer program product including program code, which when input in a memory and executed by a processor executes the method as described above.

The computer program product has essentially the same advantages as the above described system.

According to a sixth aspect, the invention relates to use of a remote arrangement for installation of a monitoring unit according to the method described above.

The use of a remote arrangement has essentially the same advantages as the above described system.

BRIEF DESCRIPTION OF THE DRAWINGS

Further objects, features and advantages of the invention will appear from the following detailed description of embodiments of the invention with reference to the accompanying drawings, in which.

DETAILED DESCRIPTION OF EMBODIMENTS OF THE INVENTION

Figure 1:
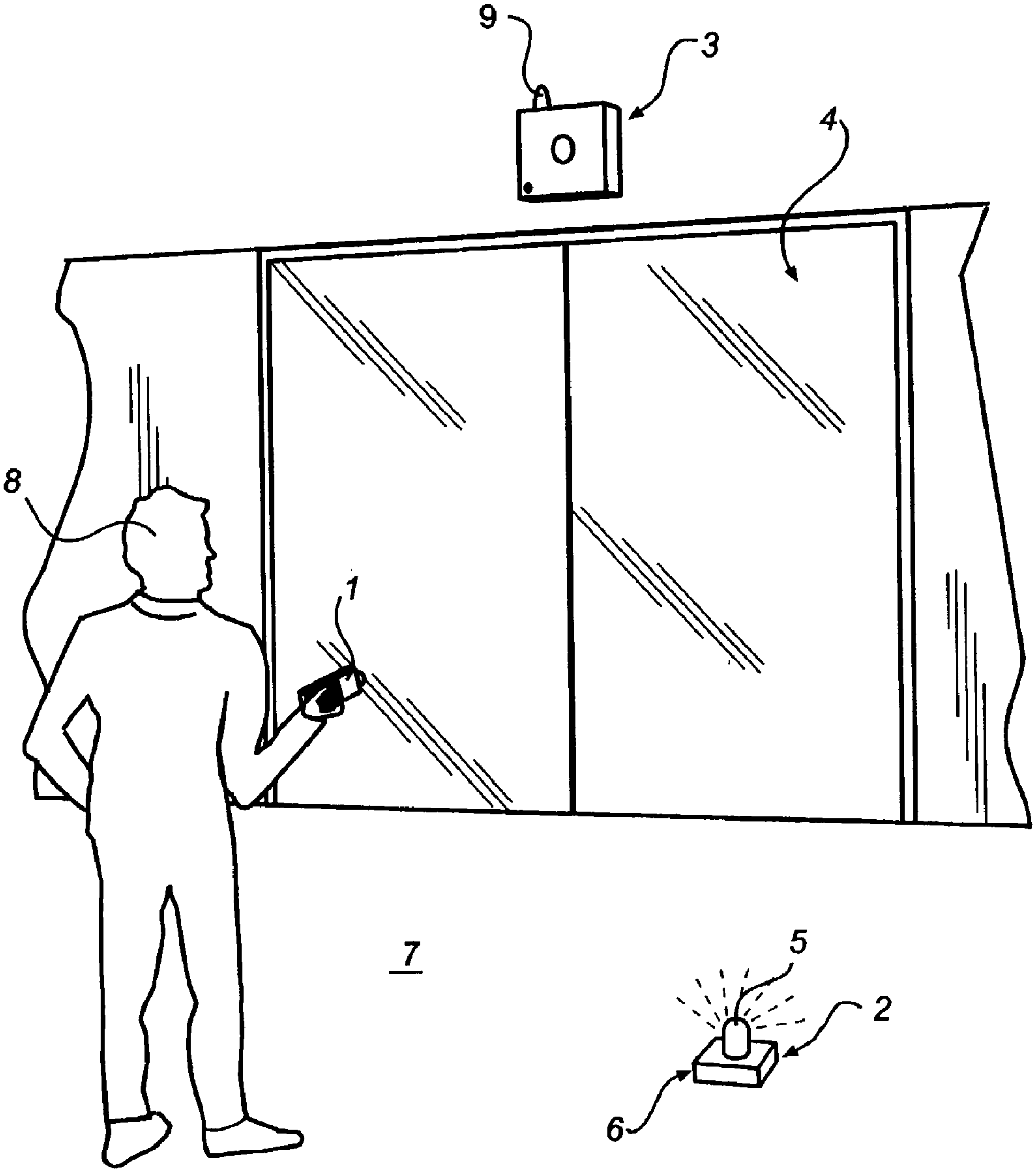
FIG. 1 is a perspective view of a system according to a first embodiment of the present invention.

FIG. 1 is a perspective view of the system for installation according to the first embodiment. The system comprises a remote arrangement 1 sending a signal containing information regarding the position of a marker 2 on a base 7 to a monitoring unit 3.

The marker 2 may comprise a lamp 5 with an intense circular point-source light, such as a light emitting diode. The lamp 5 can be mounted on top of a box 6 provided with a matt black tarnish surface surrounding the lamp. The lamp blinks with a predetermined frequency which can be 2 times per second. The box 6 is formed with a flat side so that a person carrying out the installation can put it on the base 7 in order to mark a position. A person 8 carrying out the installation controls the remote arrangement 1 and moves the marker 2 to different positions on the base 7.

The monitoring unit 3 is arranged above a door arrangement 4 and controls opening/closing of the same. The door arrangement 4 is in this case a sliding door.

Figure 2:
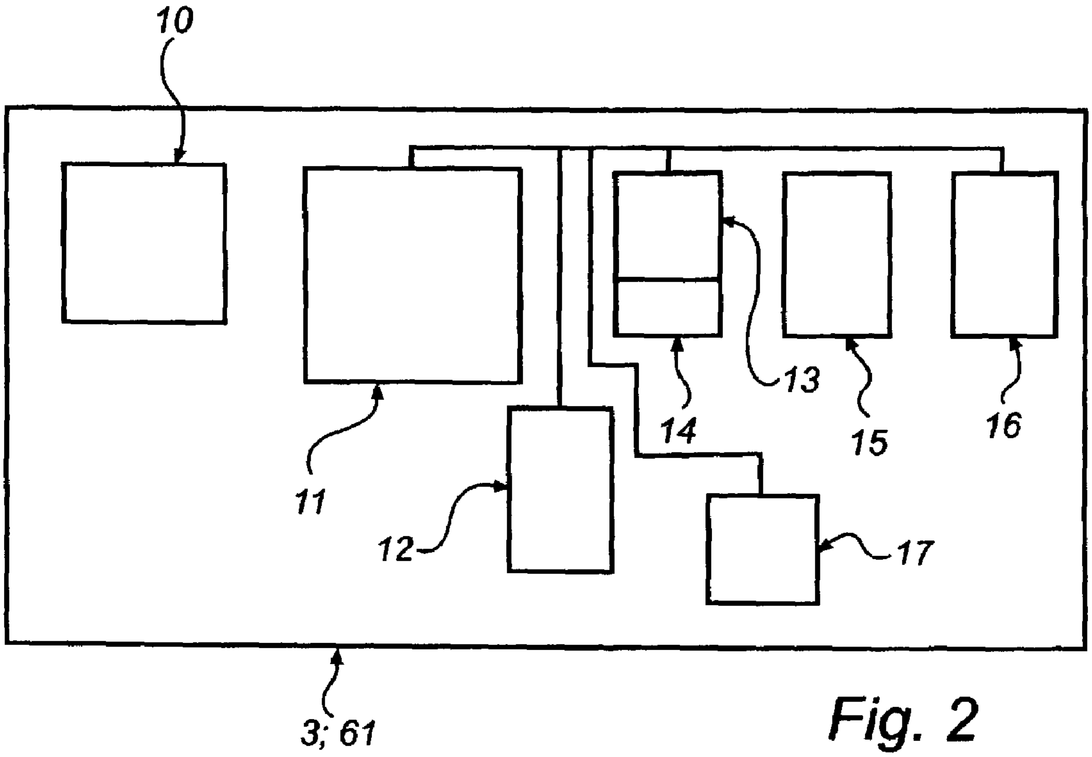
FIG. 2 is a block diagram of a monitoring unit included in the system according to FIG. 1.

FIG. 2 is a block diagram of the hardware in the monitoring unit 3. The monitoring unit 3 is supplied with power by a power connection 10. Further the monitoring unit 3 comprises a processing unit 11 which can be implemented by a commercially available microprocessor such as a CPU ("Central Processing Unit"), a DSP ("Digital Signal Processor") or another programmable logic device such as an FPGA, or alternatively as an ASIC ("Application-Specific Integrated Circuit"), as discrete analog and digital components, or in any combination thereof.

The monitoring unit 3 can also comprise a communication unit 12. The communication unit 12 is arranged for wireless communication, for example with IR light, radio waves or ultrasound, with the remote arrangement 1. The communication unit 12 can also communicate with a door motor (not shown) to transmit information about the opening/closing state of the door arrangement.

The monitoring unit 3 further comprises a photosensitive sensor 13, for example a two-dimensional CCD or a CMOS sensor, to record images. The sensor 13 is integrated on a printed circuit card and has an associated lens arrangement 14. The lens in the lens arrangement can for example have an aperture angle of 130 degrees.

Moreover, the monitoring unit 3 comprises a RAM memory 15. The monitoring unit 3 operates with a suitable operating system and can carry out advanced image processing. The monitoring unit 3 also comprises a permanent memory 16 for computer code and other data which has to be saved in a nonvolatile memory. In addition there can be an indicator 17, for example in form of a light emitting diode, which is turned on or off to indicate the special function explained in more detail below.

All the components included in the monitoring unit 3 can be integrated on one printed circuit card. The advantage of this is that the monitoring unit 3 becomes very stable, that is less sensitive to noise sources and having less points where sabotage and malfunction can occur.

The algorithms for the function of the invention are stored in the permanent memory 16.

Figure 3:
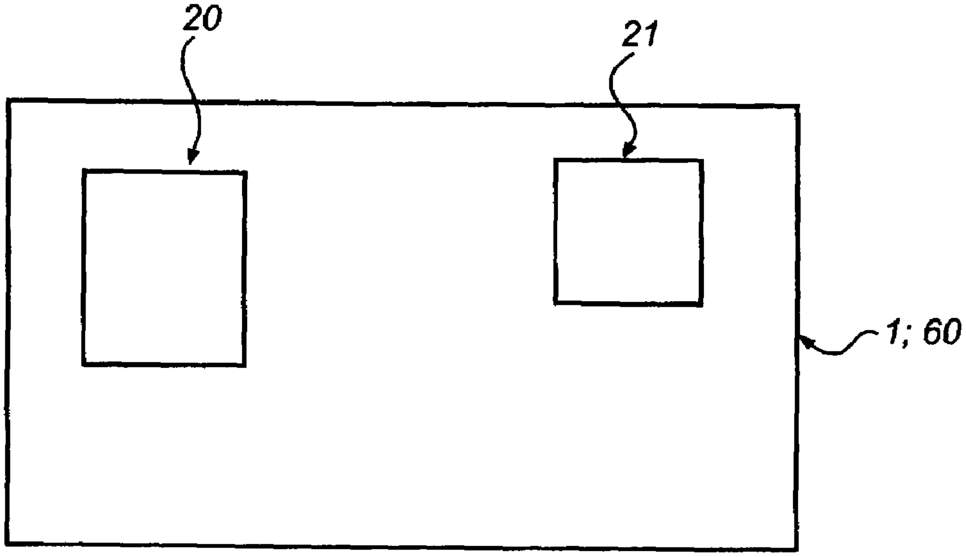
FIG. 3 is a block diagram of a remote arrangement included in the system according to FIG. 1.

FIG. 3 shows a block diagram of the remote arrangement 1. The remote arrangement can function similarly to a remote control of a TV receiver. The power supply for the remote arrangement 1 is obtained from a battery 20. Further, the remote arrangement 1 comprises a transmitter 21. The transmitter 21 is arranged for wireless transmission of a signal, for example, using IR light, radio waves, or ultra sound, to the monitoring unit 3 and/or the marker 2.

Figure 4:
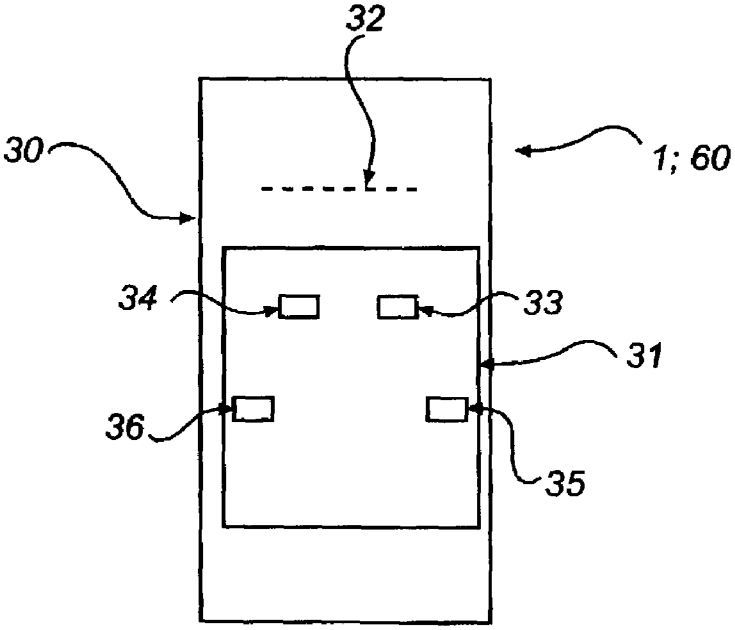
FIG. 4 is a plan view of a remote arrangement with a key set according to one embodiment of the present invention.

A cover 30 of the remote arrangement 1 is further shown in FIG. 4 and comprises a key set 31. The signal to the monitoring unit 3 comprises information about which key on the key set 31 is pressed by the person 8 carrying out the installation.

In the first embodiment, the monitoring unit 3 is used to control the opening/closing of the sliding door 4, which can be seen in FIG. 1. The sliding door 4 is to be opened when a person is approaching it, and closed when a person is moving away from it. There can be a large number of different criteria indicating when the sliding door 4 is to be opened/closed, such as the distance between the person and the sliding door 4 when opening is going to begin. To control opening/closing, the sensor 13 in the monitoring unit 3 is continuously recording images of a location in front of the sliding door. The recorded images are analyzed to decide whether a motion detection occurs and where in the image the motion detection occurs.

Figure 5:
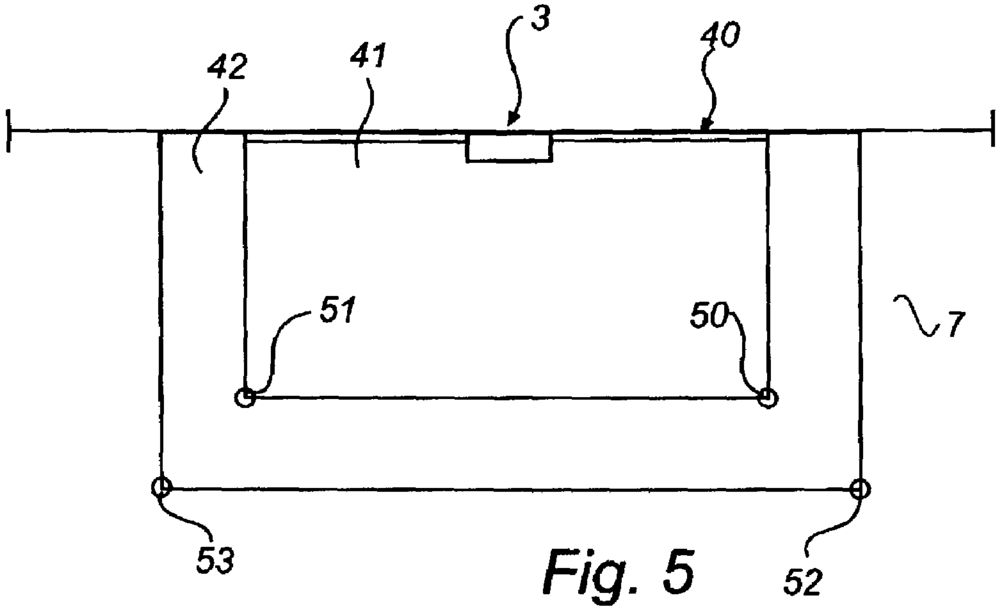
FIG. 5 is a plan view of a door arrangement with different sub-locations marked.

FIG. 5 is a top plan view of a sliding door 40 above which a monitoring unit 3 is arranged. A first sub-location 41 and a second sub-location 42 are marked in the Figure. The sub-locations 41, 42 are not marked in the real environment but only illustrated in the Figure to facilitate the explanation. The sub-locations can be different depending on in what connection the monitoring unit is used and where the monitoring unit is arranged. When installing a monitoring unit it is always necessary to set up the sub-locations that apply to that particular application and place.

Depending on in what sub-locations 41, 42 motion detection occurs the monitoring unit 3 will make a decision whether the sliding door is to be opened, closed, kept open or kept closed.

The sub-locations 41, 42 are specified by four points 50, 51, 52, 53, which are shown in FIG. 5 for illustrative purposes and accordingly are only virtual and not marked on the base 7.

When installing of the monitoring unit 3, said sub-locations are set up in such a manner that the monitoring unit 3 can make the right decision from the recorded images. The person making the installation does not need to have special knowledge to perform the installation, but the installation can be carried out essentially by any person after reading a short and simple manual.

To simplify the installation, the key set 31 of the remote arrangement 1 is formed to correspond to the positions 50, 51, 52, 53. The key set 31 is thus formed according to a specific pattern showing in what places in relation to each other and in relation to the door arrangement the person carrying out the installation 8 is to place the marker 2 to set up the correct sub-locations in the monitoring unit 3. The dashed line 32 on the remote arrangement 1 marks the position of the door arrangement in relation to the points.

The person carrying out the installation 8 first places the marker 2 in a first position 50 on the base 7. The person carrying out the installation wants this position 50 to mark a corner in the first sub-location 41. To simplify the detection of the marker, the illumination of the monitored location is advantageously subdued. Outdoors, one can place oneself so as to shade the marker 2 from direct sunlight. After the marker 2 has been placed, the person 8 carrying out the installation pushes a key 33 on the key set 31 of the remote arrangement 1. The lamp 5 of the marker can be switched on and give light or flash during the whole installation. The lamp can also be activated when pushing the key by the remote arrangement 1 transmitting a signal about activating the lamp to the marker 2.

When the person carrying out the installation pushes the key 33, a signal is transmitted to the monitoring unit 3, the signal comprising information about what point 50 in the sub-location is going to be set. The monitoring unit 3 records an image and finds by image processing a white point against a black background in the image. A difference image is calculated between two images recorded adjacent in time. A maximum in the image is calculated and the coordinates for this maximum correspond to the point for the marker in the image.

The detected coordinates for the marker are stored both in the RAM memory 15 to be able to be used directly and in the permanent memory 16 so that the coordinates will be stored even if the monitoring unit is turned off for a while.

The next position on the base 7 can now be recorded. The person 8 carrying out the installation moves the marker 2 to a new selected position on the base. Once again he pushes a key 32 on the remote arrangement 1. A second point 51 in the image is recorded and its coordinates are stored. The same procedure is used to record the remaining positions 52, 53.

The monitoring unit 3 now has enough information to divide the image into different sub-locations 41, 42 within which different rules apply.

The monitoring unit 3 can be arranged to connect recorded points with straight lines or to let the locations around the door arrangement form semicircles. Also other patterns and figures are possible.

Figure 6:
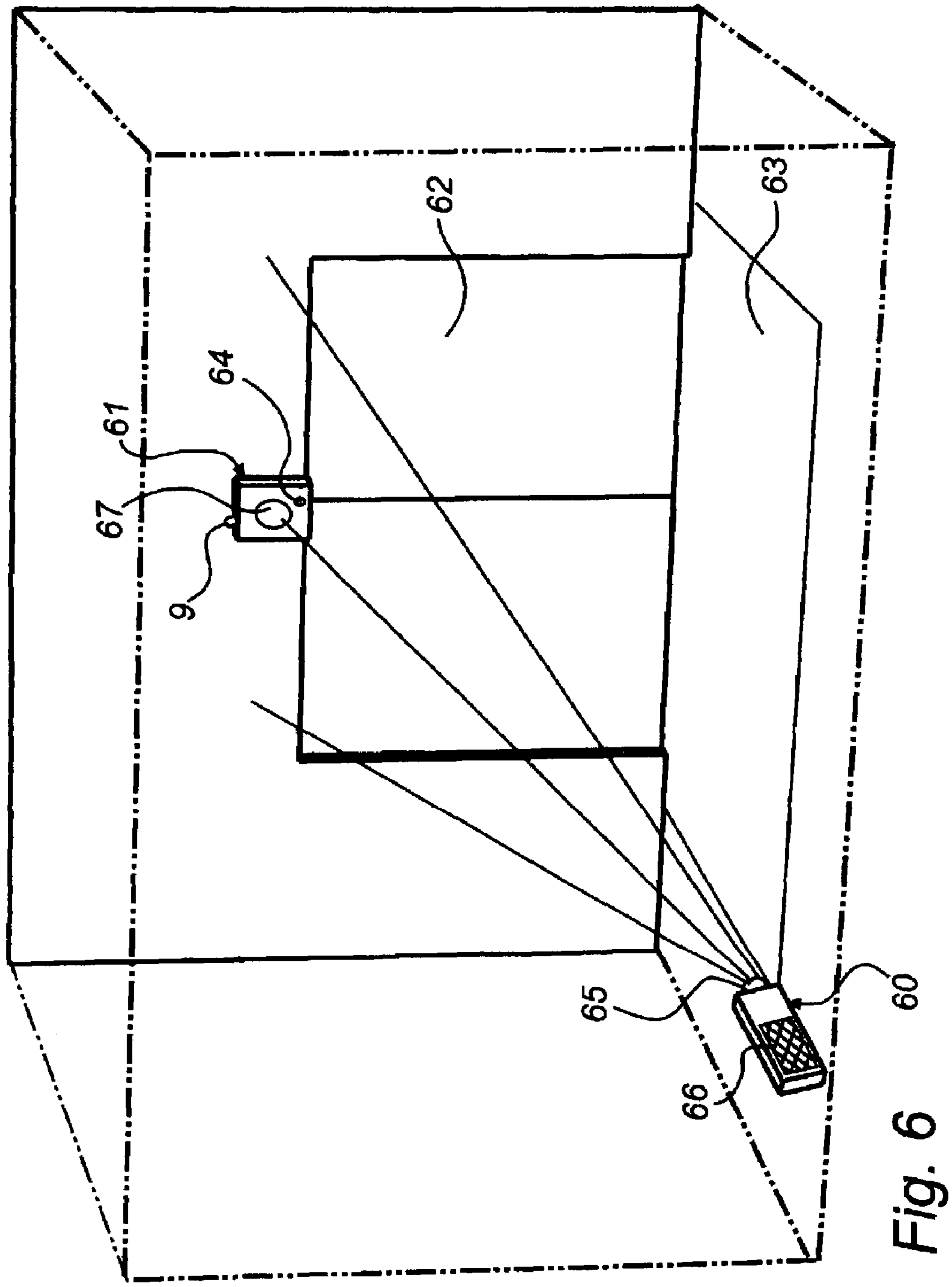
FIG. 6 is a perspective view of a system according to a second embodiment of the present invention.

A second embodiment is shown in FIG. 6 and the monitoring unit works in a similar way as described above with reference to FIG. 5. Also the remote arrangement can work as described above with reference to FIG. 3 and FIG. 4 except for the marker which is now integrated with the remote arrangement as shown in FIG. 6. The remote arrangement 60 can be an ordinary remote control of the type as used for TV receivers. The remote arrangement 60 itself is placed on or held against the base. The remote arrangement 60 transmits a signal by means of an IR transmitter 65 to a monitoring unit 61 with IR pulses. The IR transmitter 65 can advantageously be realized as a commercially available light emitting diode (LED) with a wavelength in the infrared part of the spectrum.

The monitoring unit 61 receives the signal by means of an IR receiver 64. The monitoring unit 61 is also in this embodiment arranged to control the opening/closing of a sliding door 62. The same IR transmitter 65 used to transmit a signal to the monitoring unit 61 can be used as a "lamp" since the photosensitive sensor 67 is also sensitive to IR light. The remote arrangement 60 will thus at the same time be a marker. Pushing a key on the key set 66 of the remote arrangement 60 results in the fact that IR light is pulsed out from the remote arrangement 60 at a specified frequency in a pulse train. Different key pushings result in different pulse trains. If a key on the remote arrangement 60 is kept pushed in, a pulse train is repeated at a specified interval, for example of 30 ms.

By setting up a sub-location 63, a person carrying out the installation places the monitoring unit 61 at a certain location and pushes a key on the key set 66, which key corresponds to a point which partly specifies a desired sub-location 63. An IR pulse train is transmitted to the monitoring unit 61. The monitoring unit 61 receives the signal by means of the IR receiver 64 as decoder. The IR signal contains information about which position in FIG. 5 corresponds to the detection. In response to the signal, the monitoring unit 61 records an image sequence using a photosensitive sensor 67. The monitoring unit 61 detects where in the recorded image the remote arrangement 60 is to be found. The IR pulse train is sent at intervals, for example of 30 ms, and will therefore flash in the recorded images. The difference between two images recorded adjacent in time is calculated. Since the IR light flashes, sometimes a light is recorded and sometimes no light is recorded. The difference image detects this flashing and in this way the position of the remote arrangement 60 in the image is obtained. The coordinates can in this way be calculated and stored to be used when the monitoring unit 61 is used in its normal function.

When the monitoring unit 61 has calculated and stored the coordinates for this point, the person carrying out the installation can move the remote arrangement 60 and push another key to record the next point specifying desired sub-location 63.

The person carrying out the installation can also, instead of marking separate positions, "draw" the desired sub-location, such as a threshold, by following the delimitation of the desired sub-location using the remote arrangement. The photosensitive sensor 13 records continuously images and detects the position of the remote arrangement in every image. In that way the desired sub-location is set up in the monitoring unit.

In an alternative embodiment, the remote arrangement 1, according to the first embodiment, can be arranged to transmit a signal to the marker 2. This signal contains information about at what frequency the lamp 4 will flash when it emits light. The monitoring unit 3 has information about what flashing frequencies represent the respective points on the base 7. In this case there is no need for the remote arrangement to send any signal to the monitoring unit. Instead the monitoring unit 3 can be set in a specified on-position, which implies that the monitoring unit seeks out light points and calculates their flashing frequency in order to determine in this way what point in a sub-location they represent. It is also possible to have solely a lamp which can be set up at different flashing frequencies. A separate remote arrangement is then unnecessary.

In a further example, the recording of the point can also be slightly delayed, so that the person carrying out the installation first pushes a specified key on the remote arrangement and then puts the remote arrangement in place. After a specified number of seconds after the key pushing, the remote arrangement transmits an IR pulse train and the monitoring unit records an image.

Another alternative is that the marker has a lamp shining with a fixed light. The monitoring unit 3 records an image and performs an image analysis of the image by performing a threshold operation, which results in an indication of how intense a possible detection is and where in the image it occurs.

If the lamp is placed on a base with a black tarnish surface, it is also possible to look for image points with high intensity close to image points with low intensity. When a possible position for the marker has been calculated, this position is verified by adapting a white ellipse against a black background. This is done because due to perspective the shining circular point effects appears as an ellipse in the image.

The remote arrangement can be used in a large number of applications by installation of monitoring units and sensors, in which the monitored location is to be divided into different sub-locations. Different kinds of software in the monitoring unit can control how recorded points/positions are to divide a location and what the function will be in these sub-locations. The monitoring unit can for example be used in burglar surveillance.

Alternatively, the remote arrangement does not need a key set formed according to a specific pattern, but the monitoring unit can be arranged to connect recorded points according to a specific scheme which among other things can be dependent on the order in which the points are recorded or the distance between different points. For example, adjacent points can be linked with each other in order to create a location in the image.

The monitoring unit 3, 61 can be provided with an indication element 9, as shown in FIGS. 1 and 6. The indication element 9 can for example be a light emitting diode turned on when the remote arrangement 1, 60 transmits a signal to the monitoring unite 3, 61 and turned off when the monitoring unit 3, 61 has found the position of the coordinates of the marker 2, 60 in a recorded image.

It is obvious that many modifications of the above described embodiments of the invention are possible within the scope of the invention specified by the appended claims.

What we claim and desire to secure by Letters Patent is:

1. A system for installation of a monitoring unit having a photosensitive sensor for recording images of a monitored area, said system comprising:

a light emitting element, the monitoring unit being arranged to detect the position of the light emitting element in a recorded image and by means of said position, specify a sub-location within the monitored area; and a remote arrangement including a key set provided on said remote arrangement, the key set having at least one key in a determined pattern so that each key in the key set is associated with a determined position of the monitored area and the determined pattern corresponds to a pattern of determined positions in the monitored area with respect to the monitoring unit being installed, and a means for sending, said means for sending being configured to emit a signal to the monitoring unit, said signal including information about which of said at least one key being pressed.

2. The system according to claim 1, wherein the monitoring unit further comprises a means for receiving a signal comprising information identifying said position.

3. The system according to claim 2, wherein said means for receiving and the photosensitive sensor consist of one and the same component.

4. The system according to claim 1, wherein each determined position in the monitored area specifies a sub-location of the monitored.

5. The system according to claim 1, wherein the light emitting element is integrated with the remote arrangement.

6. The system according to claim 5, wherein the light emitting element and said means for sending consist one and the same component.

7. The system according to claim 6, wherein said component is a light emitting diode, particularly an IR light emitting diode.

8. The system according to claim 1, wherein the monitoring unit further comprises a memory arranged to store said detected position for later use in a control program.

9. The system according to claim 1, wherein the light emitting element is moveable in the monitored location.

10. The system according to claim 1, wherein the monitoring unit further comprises an indication element indicating that the position of the light emitting element is detected.

11. An arrangement for installation of a monitoring unit having a photosensitive sensor for recording images of a monitored location, comprising:

a key, the key set having at least one key in a determined pattern so that each key in the key set is associated with a determined position of the monitored location and the determined pattern corresponds to a pattern of determined positions in the monitored location, and a means for sending, the means for sending being configured to emit a signal to the monitoring unit, the signal including information about which of said at least one key being pressed.

12. The arrangement according to claim 11, wherein the means for sending comprises a light emitting element.

* * * * *